United States Patent
Davis et al.

(10) Patent No.: US 6,826,157 B1
(45) Date of Patent: Nov. 30, 2004

(54) SYSTEMS, METHODS, AND COMPUTER PROGRAM PRODUCTS FOR CONTROLLING DATA RATE REDUCTIONS IN A COMMUNICATION DEVICE BY USING A PLURALITY OF FILTERS TO DETECT SHORT-TERM BURSTS OF ERRORS AND LONG-TERM SUSTAINABLE ERRORS

(75) Inventors: Gordon Taylor Davis, Chapel Hill, NC (US); Jeffrey Haskell Derby, Chapel Hill, NC (US); Malcolm Scott Ware, Raleigh, NC (US); Charles Robert Young, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,972

(22) Filed: Oct. 29, 1999

(51) Int. Cl.[7] .............................. H04J 1/16; H04J 3/16
(52) U.S. Cl. ........................ 370/252; 370/465; 375/229
(58) Field of Search ............................... 370/254, 465, 370/252; 375/222, 229, 230, 231, 232, 240.02; 348/465, 478, 468; 714/308, 799; 379/28, 93.08, 93.09, 93.33

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |

(List continued on next page.)

FOREIGN PATENT DOCUMENTS

| | | | |
|---|---|---|---|
| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | ........... H04L/27/00 |
| FR | 2 345 019 | 3/1976 | ........... H04L/27/10 |
| WO | WO 96/18261 | 6/1996 | .......... H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).

(List continued on next page.)

*Primary Examiner*—Andy Lee
(74) *Attorney, Agent, or Firm*—Myers Bigel Sibley & Sajovec, P.A.; Scott W. Reid

(57) ABSTRACT

Data rate control systems, methods, and computer program products in which an error counter is maintained that contains an error count. The error counter is periodically sampled to determine a sampling interval error count corresponding to a change in the error count since a previous read of the error counter. The sampling interval error count is provided to a first filter that is characterized by a slow time-constant and a second filter that is characterized by a fast time-constant. The first filter generates a slow-filtered sampling interval error count while the second filter generates a fast-filtered sampling interval error count, which are used as a basis for generating a data rate slowdown request signal. More specifically, the data rate slowdown request signal is generated if either the slow-filtered sampling interval error count or the fast-filtered sampling interval error count exceeds a threshold respectively associated therewith. Advantageously, the first filter, which is characterized by a slow time-constant, may be used to respond to lower numbers of errors that are sustained over an extended time period while the second filter, which is characterized by a fast time-constant, may be used to respond to large error bursts spanning a shorter time period. Moreover, by filtering the errors accumulated during each sampling interval, sensitivity with respect to the position in time of a given error burst relative to boundaries between sampling intervals may be avoided.

47 Claims, 6 Drawing Sheets

U.S. PATENT DOCUMENTS

| | | | |
|---|---|---|---|
| 4,577,310 A | 3/1986 | Korsky et al. ................. 370/58 |
| 4,578,796 A | 3/1986 | Charalambous et al. ........ 375/8 |
| 4,720,861 A | 1/1988 | Bertrand ...................... 381/36 |
| 4,731,816 A | 3/1988 | Hughes-Hartogs ........... 379/98 |
| 4,756,007 A | 7/1988 | Qureshi et al. ............... 375/37 |
| 4,760,598 A | 7/1988 | Ferrell ......................... 380/44 |
| 4,797,898 A | 1/1989 | Martinez ....................... 375/7 |
| 4,833,706 A | 5/1989 | Hughes-Hartogs ........... 379/98 |
| 4,868,863 A | 9/1989 | Hartley et al. ................ 379/98 |
| 4,884,285 A | 11/1989 | Heynen et al. ............... 375/25 |
| 4,890,303 A | 12/1989 | Bader ........................ 375/107 |
| 4,890,316 A | 12/1989 | Walsh et al. ................. 379/98 |
| 4,894,847 A | 1/1990 | Tjahjadi et al. ............. 375/121 |
| 4,901,333 A | 2/1990 | Hodgkiss ..................... 375/98 |
| 4,943,980 A | 7/1990 | Dobson et al. ............... 375/42 |
| 4,953,210 A | 8/1990 | McGlynn et al. ............. 380/48 |
| 4,967,413 A | 10/1990 | Otani ........................ 371/37.4 |
| 4,972,360 A | 11/1990 | Cukier et al. .......... 364/724.04 |
| 4,985,902 A | 1/1991 | Gurcan ........................ 375/14 |
| 4,991,169 A | 2/1991 | Davis et al. .................. 370/77 |
| 4,995,030 A | 2/1991 | Helf .......................... 370/32.1 |
| 5,005,144 A | 4/1991 | Nakajima et al. ........... 364/565 |
| 5,007,047 A | 4/1991 | Sridhar et al. ............. 370/32.1 |
| 5,014,299 A | 5/1991 | Klupt et al. ................. 379/98 |
| 5,033,062 A | 7/1991 | Morrow et al. ................. 375/7 |
| 5,038,365 A | 8/1991 | Belloc et al. .................. 375/8 |
| 5,040,190 A | 8/1991 | Smith et al. ................... 375/4 |
| 5,052,000 A | 9/1991 | Wang et al. .................. 371/43 |
| 5,058,134 A | 10/1991 | Chevillat et al. ............. 375/39 |
| 5,065,410 A | 11/1991 | Yoshida et al. ............... 375/98 |
| 5,067,125 A | 11/1991 | Tsuchida ..................... 370/79 |
| 5,068,875 A | 11/1991 | Quintin ....................... 375/78 |
| 5,107,520 A | 4/1992 | Karam et al. ................. 375/60 |
| 5,111,481 A | 5/1992 | Chen et al. ................... 375/14 |
| 5,119,401 A | 6/1992 | Tsujimoto .................... 375/14 |
| 5,119,403 A | 6/1992 | Krishnan ..................... 375/39 |
| 5,134,611 A | 7/1992 | Steinka et al. ................ 370/79 |
| 5,142,552 A | 8/1992 | Tzeng et al. ................. 375/14 |
| 5,157,690 A | 10/1992 | Buttle ......................... 375/14 |
| 5,187,732 A | 2/1993 | Suzuki ......................... 379/5 |
| 5,210,755 A | 5/1993 | Nagler et al. ............... 370/108 |
| 5,225,997 A | 7/1993 | Lederer et al. ............. 364/550 |
| 5,253,272 A | 10/1993 | Jaeger et al. ................. 375/60 |
| 5,253,291 A | 10/1993 | Naseer et al. ............... 379/406 |
| 5,265,151 A | 11/1993 | Goldstein .................... 379/97 |
| 5,285,474 A | 2/1994 | Chow et al. .................. 375/13 |
| 5,291,479 A | 3/1994 | Vaziri et al. ............... 370/58.2 |
| 5,311,578 A | 5/1994 | Bremer et al. ................ 379/97 |
| 5,317,594 A | 5/1994 | Goldstein ....................... 375/8 |
| 5,351,134 A | 9/1994 | Yaguchi et al. ............. 358/435 |
| 5,353,280 A | 10/1994 | Ungerböck ................ 370/32.1 |
| 5,386,438 A | 1/1995 | England ..................... 375/121 |
| 5,394,110 A | 2/1995 | Mizoguchi .................. 329/304 |
| 5,394,437 A | 2/1995 | Ayanoglu et al. ........... 375/222 |
| 5,398,303 A | 3/1995 | Tanaka ........................ 395/51 |
| 5,402,445 A | 3/1995 | Matsuura .................... 375/229 |
| 5,406,583 A | 4/1995 | Dagdeviren .................... 375/5 |
| 5,418,842 A | 5/1995 | Cooper ....................... 379/98 |
| 5,432,794 A | 7/1995 | Yaguchi ..................... 371/5.5 |
| 5,434,884 A | 7/1995 | Rushing et al. ............. 375/235 |
| 5,475,711 A | 12/1995 | Betts et al. .................. 375/240 |
| 5,491,720 A | 2/1996 | Davis et al. ................. 375/222 |
| 5,513,216 A | 4/1996 | Gadot et al. ................ 375/233 |
| 5,519,703 A | 5/1996 | Chauffour et al. ............ 370/84 |
| 5,528,625 A | 6/1996 | Ayanoglu et al. ........... 375/222 |
| 5,528,679 A | 6/1996 | Taarud ........................ 379/34 |
| 5,533,048 A | 7/1996 | Dolan ........................ 375/222 |
| 5,534,913 A | 7/1996 | Majeti et al. ................... 348/7 |
| 5,546,395 A | 8/1996 | Sharma et al. ............... 370/84 |
| 5,563,908 A | 10/1996 | Kaku et al. ................. 375/222 |
| 5,566,211 A | 10/1996 | Choi .......................... 375/332 |
| 5,598,401 A | 1/1997 | Blackwell et al. ............ 379/94 |
| 5,625,643 A | 4/1997 | Kaku et al. .................. 375/222 |
| 5,634,022 A | 5/1997 | Crouse et al. ............... 395/704 |
| 5,640,387 A | 6/1997 | Takahashi et al. .......... 370/359 |
| 5,646,958 A | 7/1997 | Tsujimoto ................... 375/233 |
| 5,671,250 A | 9/1997 | Bremer et al. .............. 375/222 |
| 5,694,420 A | 12/1997 | Ohki et al. .................. 375/222 |
| 5,710,792 A | 1/1998 | Fukawa et al. ............. 375/229 |
| 5,724,393 A | 3/1998 | Dagdeviren ................. 375/296 |
| 5,726,765 A | 3/1998 | Yoshida et al. ............. 358/412 |
| 5,729,226 A | 3/1998 | Betts et al. .................... 341/94 |
| 5,732,104 A | 3/1998 | Brown et al. ............... 375/222 |
| 5,734,663 A | 3/1998 | Eggenberger .............. 371/39.1 |
| 5,751,717 A | 5/1998 | Babu et al. ................. 370/466 |
| 5,751,796 A | 5/1998 | Scott et al. ............. 379/93.31 |
| 5,754,594 A | 5/1998 | Betts et al. .................. 375/285 |
| 5,757,849 A | 5/1998 | Gelblum et al. ............ 375/222 |
| 5,757,865 A | 5/1998 | Kaku et al. .................. 375/344 |
| 5,761,247 A | 6/1998 | Betts et al. .................. 375/316 |
| 5,768,311 A | 6/1998 | Betts et al. .................. 375/222 |
| 5,778,024 A | 7/1998 | McDonough ............... 375/216 |
| 5,784,377 A | 7/1998 | Baydar et al. .............. 370/463 |
| 5,784,405 A | 7/1998 | Betts et al. .................. 375/222 |
| 5,784,415 A | 7/1998 | Chevillat et al. ........... 375/341 |
| 5,793,809 A | 8/1998 | Holmquist .................. 375/242 |
| 5,796,808 A | 8/1998 | Scott et al. ............. 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. .................. 370/286 |
| 5,815,534 A | 9/1998 | Glass ......................... 375/326 |
| 5,822,371 A | 10/1998 | Goldstein et al. ........... 375/242 |
| 5,825,816 A | 10/1998 | Cole et al. .................. 375/222 |
| 5,825,823 A | 10/1998 | Goldstein et al. ........... 375/286 |
| 5,831,561 A | 11/1998 | Cai et al. .................... 341/106 |
| 5,835,532 A | 11/1998 | Strolle et al. ............... 375/233 |
| 5,835,538 A | 11/1998 | Townshend ................. 375/295 |
| 5,838,724 A | 11/1998 | Cole et al. .................. 375/222 |
| 5,839,053 A | 11/1998 | Bosch et al. ............... 455/13.1 |
| 5,844,940 A | 12/1998 | Goodson et al. ............ 375/222 |
| 5,850,388 A | 12/1998 | Anderson et al. ........... 370/252 |
| 5,850,421 A | 12/1998 | Misra et al. ................. 375/354 |
| 5,852,631 A | 12/1998 | Scott .......................... 375/222 |
| 5,862,141 A | 1/1999 | Trotter ....................... 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. .......... 375/222 |
| 5,872,817 A | 2/1999 | Wei ............................ 375/341 |
| 5,881,066 A | 3/1999 | Lepitre ...................... 371/20.5 |
| 5,881,102 A | 3/1999 | Samson ...................... 375/222 |
| 5,887,027 A | 3/1999 | Cohen et al. ................ 375/222 |
| 5,911,115 A | 6/1999 | Nair et al. ..................... 455/63 |
| 5,914,982 A | 6/1999 | Bjarnason et al. .......... 375/222 |
| 5,918,204 A | 6/1999 | Tsurumaru .................. 704/214 |
| 5,926,506 A | 7/1999 | Berthold et al. ............ 375/222 |
| 6,272,108 B1 * | 8/2001 | Chapman .................... 370/226 |
| 6,643,334 B1 * | 11/2003 | Limberg ..................... 375/321 |
| 6,711,207 B1 * | 3/2004 | Amrany et al. ............. 375/222 |
| 6,728,216 B1 * | 4/2004 | Sterner ....................... 370/252 |
| 6,731,653 B1 * | 5/2004 | Henderson et al. ......... 370/490 |
| 6,744,813 B1 * | 6/2004 | Ko et al. ..................... 375/224 |

OTHER PUBLICATIONS

Fischer, *Signal Mapping for PCM Modems, V-pcm Rapporteur Meeting*, Sunriver, Oregon, USA,, 5 pgs. (Sep. 4–12, 1997).

Gardner, *Interpolation in Digital Modems—Part I: Fundamentals*, IEEE Transactions on Communications, vol. 41, No. 3, pp. 501–507 (Mar. 1993).

Humblet et al., *The Information Driveway*, IEEE Communications Magazine, pp. 64–68 (Dec. 1996).

Kalet et al., *The Capacity of PCM Voiceband Channels*, IEEE International Conference on Communications '93, pp. 507–511 (Geneva, Switzerland, May 23–26, 1993).

Mueller et al., *Timing Recovery in Digital Synchronous Data Receiver*, IEEE Transactions on Communications, vol. Com–24, No. 5, pp. 516–531 (May 1976).

Okubo et al., *Building Block–Design of Large Capacity PCM–TDMA Subscriber System and Direct Digital Interface to Digital Exchange*, Japan Radio Co., Ltd., pp. 69–73 (Japan).

Pahlavan et al., *Nonlinear Quantization and the Design of Coded and Uncoded Signal Constellations*, IEEE Transactions on Communications, vol. 39, No. 8, pp. 1207–1215 (Aug. 1991).

Proakis, *Digital Signaling Over a Channel with Intersymbol Interference*, Digital Communications, pp. 373, 381 (McGraw–Hill Book Company, 1983).

Williams et al., *Counteracting the Quantisation Noise from PCM Codecs*, BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream*, ITU–T V.90 (Sep. 1998).

*Series V: Data Communication Over the Telephone Network; Interfaces and voiceband modems; A modem operating at data singalling rates of up to 33 600 bit/s for use on the general switched telephone network and on leased point–to–point 2–wire telephone type circuits*, ITU–T V.34 (10/96).

Bell, R.A., et al., *Automatic Speed Reduction and Switched Network Back–up*, IBM Technical Disclosure Bulletin, vol. 32, No. 1, pp. 154–157 (Jun. 1989).

Abbiate, J.C., et al., *Variable–Data Transmission Modem*, IBM Technical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network*, ITU–T V.8 (09/94).

*Line Quality Monitoring Method*, IBM Technical Disclosure Bulletin, vol. 18, No. 8, pp. 2726–2726 (Jan. 1976).

*Loopback Tests for V.54 Data Communication Equipment*, IBM Technical Disclosure Bulletin, vol. 32, No. 3A, pp. 295–299 (Aug. 1989).

*On–Line Real Time Modem Testing*, IBM Technical Disclosure Bulletin, vol. 20, No. 6, pp. 2252–2254 (Nov. 1977).

Pierobon, Gianfranco L., *Codes of Zero Spectral Density at Zero Frequency*, IEEE Transactions on Information Theory, vol. IT–30, No. 2, pp. 435–439 (Mar., 1984).

Marcus, Brian H, et al., *On Codes with Spectral Nulls at Rational Submultiples of the Symbol Frequency*, IEEE Transactions on Information Theory, vol. IT–33, No. 4, pp. 557–568 (Jul. 1987).

Fischer, Robert, et al., *Signal Mapping for PCM Modems*, ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies*, ITU–T, Recommendation G.711 (Geneva, 1972).

*Series G: Digital Transmission Systems; Terminal equipments—Coding of analogue signals by pulse code modulation; Pulse code modulation (PCM) of voice frequencies*, ITU–T, Recommendation G.711 (Geneva, 1996).

*Data Communication Over the Telephone Network; Error–Correcting Procedures for DCEs Using Asynchronous–to–Synchronous Conversion*, ITU–T V.42 (03/93).

*Improvement to Spectral Shaping Technique*, Research Disclosure, V. 41, n415,415111, pp. 1550–1551 (Nov. 1998).

*TIA Standard Draft: North American Telephone Network Transmission Model for Evaluating Analog Client to Digitally Connected Server Modems*, Telecommunications Industry Association, PN3857, Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication Noisy Communication Line Environments*, IBM Technical Disclosure Bulletin, vol. 24, No. 9, pp. 4627–4629 (Feb. 1982).

Godard, D., et al., *Decision Feedback Equalizer Stabilization in Adaptive Mode*, IBM Technical Disclosure Bulletin, vol. 24, No. 11A, pp. 5691–5692 (Apr. 1982).

Borgnis–Desbordes, P., et al., *Variable–Speed Data Transmission*, IBM Technical Disclosure Bulletin, vol. 27, No. 4A, pp. 2269–2270 (Sep. 1984).

Couland, G., et al., *Analog Wrap Self–Test in Modems During Retrain Operations*, IBM Technical Disclosure Bulletin, vol. 28, No. 6, p. 2457 (Nov. 1985).

Maddens, F., *Sixteen–State Forward Convolutional Encoder*, IBM Technical Disclosure Bulletin, vol. 28, No. 6, pp. 2466–2468 (Nov. 1985).

*Remote Modem–Type Self–Learning*, IBM Technical Disclosure Bulletin, vol. 28, No. 6, pp. 2398–2399 (Nov. 1985).

Maddens, F., *Sixteen–State Feedback Convolutional Encoder*, IBM Technical Disclosure Bulletin, vol. 28, No. 10, pp. 4212–4213 (Mar. 1986).

Bell, R. A., et al., *Automatic Speed Reduction and Switched Network Back–up*, IBM Technical Disclosure Bulletin, vol. 32, No. 1, pp. 154–157 (Jun. 1989).

Nobakht, R.A., *Trellis–Coded Modulation Coding Scheme for a 19/2 Kbps Modem*, IBM Technical Disclosure Bulletin, vol. 36, No. 11, pp. 167–170 (Nov. 1993).

Nobakht, R.A., *Unified Table Based Subset Decoder for the Viterbi Algorithm*, IBM Technical Disclosure Bulletin, vol. 37, No. 09, pp. 581–587 (Sep. 1994).

Nobakht, R.A., *Trellis Subset Decoder Algorithm Based on a Pattern Recognition Scheme*, IBM Technical Disclosure Bulletin, vol. 37, No. 10, pp. 693–697 (Oct. 1994).

Abbiate, J.C., et al, *Variable–Data Transmission Modem*, IBM Technical Disclosure Bulletin, vol. 17, No. 11, pp. 3301–3302 (Apr. 1975).

Barlet, J., et al., *Full Speed Recovery in High Speed Modems*, IMB Technical Disclosure Bulletin, vol. 23, No. 2, pp. 641–643 (Jul. 1980).

Dialog Abstract, *Sample rate converter for duplex modem*, European Patent No. 285413.

Dialog Abstract, *Two–speed full–duplex modem for telephone network*, PCT No. WO 8501407.

Dialog Abstract, *Digital data transmission system*, European Patent No. 124674.

Dialog Abstract, *Facsimile communication controller*, Japanese Publication No. 04–175060 (Jun. 23, 1992).

Dialog Abstract, *Picture communication equipment*, Japanese Publication No. 03–120954 (May 23, 1991).

Dialog Abstract, *Radio date transmission system*, Japanese Publication No. 01–179535 (Jul. 17, 1989).

Dialog Abstract, *Facsimile device*, Japanese Publication No. 57–164654 (Oct. 9, 1982).

Dialog Abstract, *Data repeater*, Japanese Publication No. 57–087255 (May 31, 1982).

Dialog Abstract, *Blinding training method for decision feedback equaliser having feed–forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Naguib, A.F., et al., Dialog Abstract, *A space–time coding modem for high–data–rate wireless communications*, IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communications*, IEICE Transactions on Communications, vol. E81–B, No. 7, pp. 1453–1461 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–109 (1997).

Kobayashi, K., et al., Dialog Abstract, *Fully digital burst modem for satellite multimedia communication systems*, IEICE Transactions on Communications, vol. E80–B, No. 1, pp. 8–15 (Jan. 1997).

Skellern, D.J., et al., Dialog Abstract, *A high speed wireless LAN*, IEEE Micro, vol. 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstract, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing world MILCOM '91 (Nov. 4–7, 1991).

Jacobsmeyer, J.M., Dialog Abstract, *Adaptive trellis–coded modulation for bandlimited meteor burst channels*, IEEE Journal on Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMSAT Technical Review, pp. 195–234 (Fall 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, EEE International Conference on Communications BOSTON–ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equalizers*, IEEE Journal on Selected Areas in Communications, vol. SAC–2, No. 5, pp. 778–779 (Sep. 1984).

Dialog Abstract, *High–speed full–duplex modem reduces telephone connect time*, BDN, vol. 27, No. 18, p. 77 (Sep. 15, 1982).

Chadwick, H., et al., Dialog Abstract, *Performance of a TDMA burst moden through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mar. 1997).

Umehira, M., et al., Dialog Abstract, *Design and performance of burst carrier recovery using a phase compensated filter*, Transactions of the Institute of Electronics, Information and Communication Engineers, vol.. J78B–II, No. 12, pp. 735–746 (Dec. 1995).

De Bot, P., et al., Dialog Abstract, *An example of a multi-resolution digital terrestrial TV modem*, Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicated DSP*, Oki Technical Review, vol. 58, No. 144, pp. 49–52, (Jul. 1992).

Tamm, Yu.A., Dialog Abstract, *The effect of suppressing harmonic interference using an adaptive equalizer*, Elektrosvyaz, vol. 45, No. 3, pp. 5–10 (Mar. 1990).

Saleh, A.A.M., et al., Dialog Abstract, *An experimental TDMA indoor radio communications systemusing slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimile*, Review of the Communications Research Laboratory, vol. 36, pp. 69–73 (Mar. 1990).

Sato, T., et al., Dialog Abstract *Error–free high–speed data transmission protocol simultaneously applicable to both wire and mobile radio channels*, 38$^{th}$ IEEE Vehicular Technology Conference: 'Telecommunications Freedom—Technology on the Move', pp. 489–496 (Jun. 15–17, 1998).

Dialog Abstract, *1200–bit/s cellular modem DLD03H*, Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network*, International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity*, IEEE Military Communications Conference, vol. 1, pp. 89–93 (Oct. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87, (Jan.–Mar., 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmision via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogue and discrete channel models for signal transmission in mobile radio*, Frequenz,, vol. 36, Nos. 4–5, pp. 153–160 (Apr.–May 1982).

Farrell, P.G., et al., Dialog Abstract, *Soft–decision error control of h.f. data transmission*, IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading*, AGARD Conference Proceedings No. 173 on Radio Systems and the Ionosphere, pp. 3/1–5 (Greece, May 26–30, 1975).

Matsummura, K., et al., Dialog Abstract, *Anti–interference data–transmission set of HF radio equipment*, Mitsublishi Electric Engineer, No. 41, pp. 18–23 (Sep., 1974).

Blank, H.A., et al., Dialog Abstract, *A Markov error channel model*, 1973 National Telecommunications Conference, vol. 1, pp. 15B/1–8 (Nov. 26–28, 1973).

McGruther, W.G., Dialog Abstract, *Long term error performance data for operation at 2400 bps ona nonswitched private line network*, Summaries of papers presented at 1970 Canadian symposium on communications, pp. 65–66 (Canada, Nov. 12–13, 1970).

Burton, H.O., et al., Dialog Abstract, *On the use of error statisitics from data transmission on telephone facilities to estimate performance of forward–error–correction*, 1970 international conference on communications, p. 21 (Jun. 8–10, 1970).

Bowen, R.R., Dialog Abstract, *Application on burst error correction codes to data modems for dispersive channels*, Proceedings of the 1970 international symposium on information theory, p. 1 (Netherlands, Jun. 15–19, 1970).

Pierce, A.W., et al., Dialog Abstract, *Efective application of forward–acting error–control coding to multichannel h.f. data modems*, IEEE Transactions on Communication Technology, vol. Com–18, No. 4, pp. 281–294 (Aug. 1970).

West, R.L., Abstract, *Data Concentration Method*, IBM Technical Disclosure Bulletin, pp. 487–489; http://w3.infogate.ibm.com;1207//SESS506884/GETDOC/39/2/1 (Jul., 1975).

Haas, L.C., et al., Abstract, *Received Line Signal Quality Analysis*, IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

* cited by examiner

SYSTEMS, METHODS, AND COMPUTER PROGRAM PRODUCTS FOR CONTROLLING DATA RATE REDUCTIONS IN A COMMUNICATION DEVICE BY USING A PLURALITY OF FILTERS TO DETECT SHORT-TERM BURSTS OF ERRORS AND LONG-TERM SUSTAINABLE ERRORS

FIELD OF THE INVENTION

The present invention relates generally to the field of communication, and, more particularly, to controlling the data rate in a communication device.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the F-law or A-law companding standard (i.e., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN 28 by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analogto-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either μ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the μ-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path in the network. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

In addition to the foregoing factors, errors incurred at the data-link protocol level may also affect V.90 performance. For example, a modem may make an initial data rate selection using some indication of the line quality associated with the connection, such as mean-squared error (MSE) or signal-to-noise ratio (SNR). During many modem connections, however, there may be network impairments that are not proportionally represented in the MSE or SNR measurements, such as non-linear distortions and time-varying impairments. As a result of such impairments, a modem may make excessive errors, which may degrade data throughput.

U.S. Pat. No. 4,890,316 to Walsh et al. (hereinafter Walsh) describes a modem that uses cyclic redundancy checking (CRC) of received data frames to detect errors in received data blocks. "In the event [that] more than a predetermined number of data errors are detected with[in] a predetermined time interval, the receiving modem generates a rate change request which is transmitted . . . to the . . . transmitting modem . . . " (Walsh, col. 3, lines 23–28).

Using a single error threshold, as described, for example, in Walsh, to determine when to request a data rate slowdown may have several limitations: First, if a burst of errors occurs entirely within a single error sampling interval and the burst of errors exceeds the error threshold, then a data rate slowdown may be requested. If, however, the same burst of errors crosses an error sampling interval boundary, then a data rate slowdown may not be requested because the number of errors in either of the two sampling intervals does not exceed the error threshold. Second, line errors may not be detectable as CRC errors while the data-link protocol layer is sending idle patterns because of a lack of data to be sent. Line errors during idle periods may more likely be manifested as bad frame errors or illegal address errors. Finally, a single error threshold may be unable to discriminate between an isolated burst of errors and a lower level of errors that continues over an extended period of time. As a result, a modem may reduce its data rate too easily due to an isolated error burst or the modem may fail to reduce its data rate when subjected to a lower level of sustained errors depending on where the error threshold is set.

Consequently, there exists a need for improved data rate control mechanisms and related methods that may overcome the deficiencies in the prior art discussed hereinabove.

SUMMARY OF THE INVENTION

It is an object of the present invention to provide data rate control systems, methods, and computer program products that may be used to improve the responsiveness of a communication device to errors, such as communication protocol errors.

It is another object of the present invention to provide data rate control systems, methods, and computer program products that have an improved sensitivity to the distribution of errors with respect to error sampling intervals.

These and other objects, advantages, and features of the present invention may be provided by data rate control systems, methods, and computer program products in which an error counter is maintained that contains an error count. The error counter is periodically sampled to determine a sampling interval error count corresponding to a change in the error count since a previous read of the error counter. The sampling interval error count is provided to a first filter that is characterized by a slow time-constant and a second filter that is characterized by a fast time-constant. The first filter generates a slow-filtered sampling interval error count while the second filter generates a fast-filtered sampling interval error count, which are used as a basis for generating a data rate slowdown request signal. More specifically, the data rate slowdown request signal is generated if either the slow-filtered sampling interval error count or the fast-filtered sampling interval error count exceeds a threshold respectively associated therewith.

Unlike traditional data rate or error control systems that use a single error threshold, which may prohibit the system from discriminating between isolated bursts of many errors spanning a short time duration and fewer errors that continue to occur over an extended time frame, data rate control systems, methods, and computer program products, in accordance with the present invention, use two independent filters to process errors--one filter with a fast time-constant that may respond to large error bursts spanning a short time period and a second filter with a slow time-constant that may respond to lower numbers of errors, which are sustained over an extended time period. Moreover, by filtering the errors accumulated during each sampling interval, sensitivity with respect to the position in time of a given error burst relative to boundaries between sampling intervals may be avoided.

In accordance with an aspect of the invention, a peak limiting unit may be used to limit the sampling interval error count to a maximum error threshold. This may prevent a single noise burst from causing a data rate reduction.

In accordance with another aspect of the invention, a severe error detector may be coupled to the sampling unit that sets the sampling interval error count to zero if instability is detected in the communication device. Under unstable conditions, the severe error event(s) are preferably masked because at least a portion of the errors are presumed to be connected with the source of the modem's instability.

In accordance with yet another aspect of the invention, the slow-filtered sampling interval error count may be generated by multiplying a previous slow-filtered error count by a first weight factor, multiplying the sampling interval error count by a second weight factor, and then adding the results of the two multiplication operations. The two weight factors are preferably fractional values whose sum is equal to one. The first and second weight factors are preferably set so that the first filter is characterized by a slow time-constant.

Similarly, the fast-filtered sampling interval error count may be generated by multiplying a previous fast-filtered error count by a first weight factor, multiplying the sampling interval error count by a second weight factor, and then adding the results of the two multiplication operations. The two weight factors are preferably fractional values whose sum is equal to one. The first and second weight factors are preferably set so that the second filter is characterized by a fast time-constant.

In accordance with still another aspect of the present invention, a plurality of error counters are maintained that preferably comprise an illegal address counter and a cyclic redundancy check (CRC) counter for accumulating data-link level protocol errors. Maintaining a count of illegal address errors may be helpful in detecting line errors that occur while the data-link protocol layer is transmitting idle patterns as errors during these periods may not be detectable as CRC errors.

Thus, the data rate control systems, methods, and computer program products of the present invention may be used to generate a data rate slowdown request signal in response to both large error bursts and lower levels of errors that are sustained over an extended time period with reduced sensitivity to the distribution of the errors with respect to error sampling intervals.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
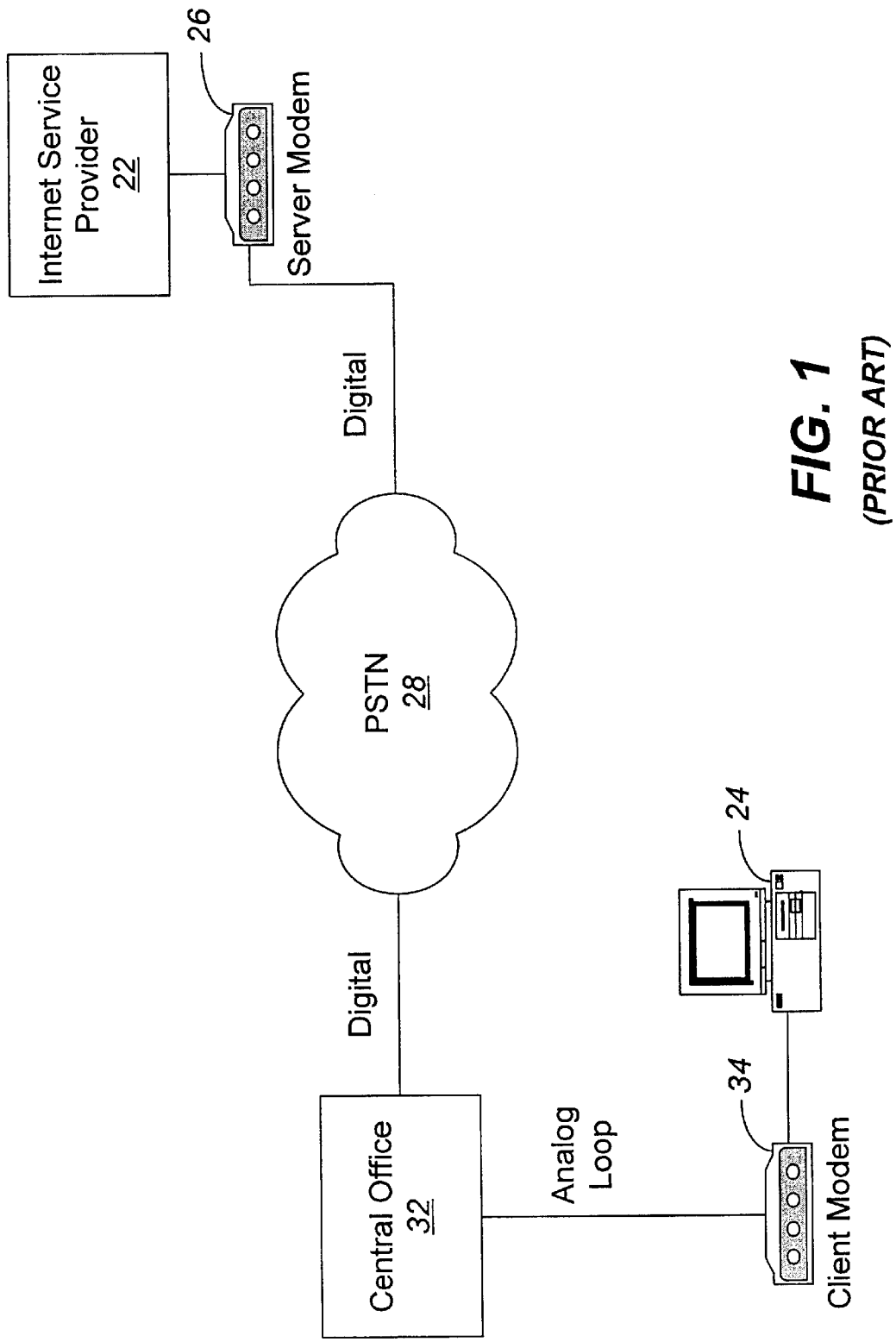
FIG. 1 is block diagram that illustrates a typical V.90 connection between a subscriber and an ISP in accordance with the prior art.
Figure 2:
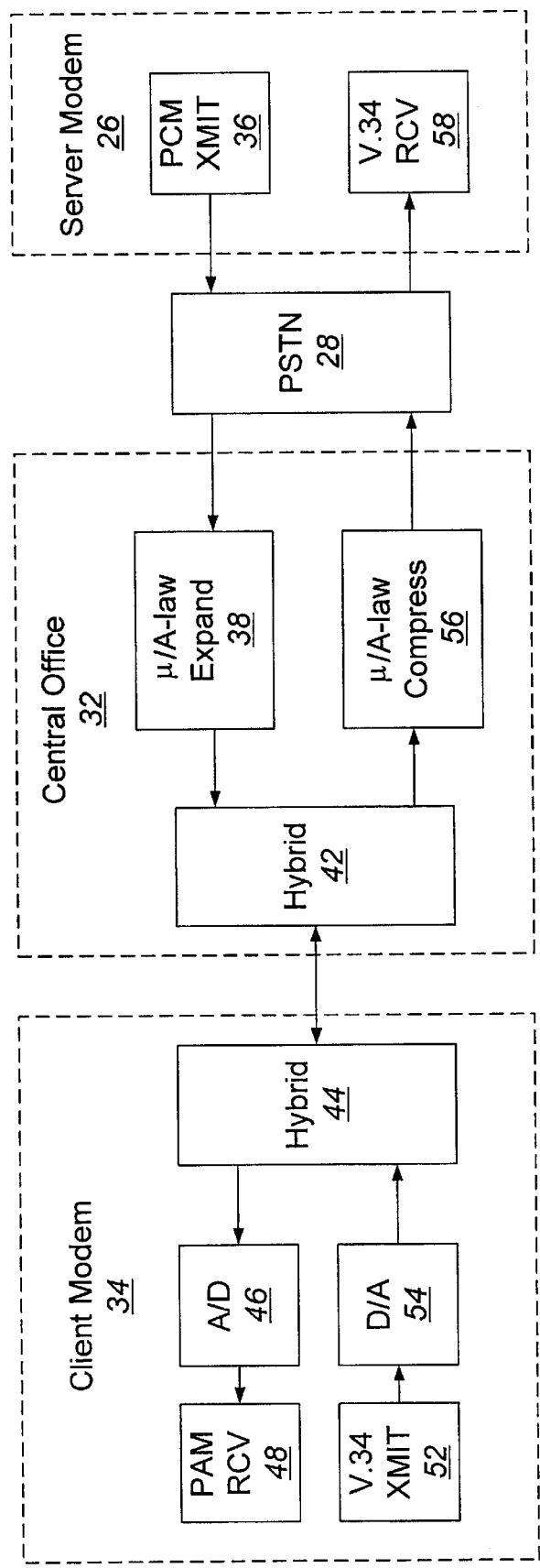
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a system, a method, or a computer program product for controlling data rate reductions in a communication device. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses micro-code to implement most software programs.

For purposes of illustration and in no way limited thereto, exemplary data rate control systems, methods, and computer program products are discussed herein in the context of a modem application. It should be understood, however, that the data rate control systems, methods, and computer program products may be used in a vast array of communication devices that track communication errors and have a capability of making data rate adjustments in response thereto.

Data Rate Control System Architecture

Figure 3:
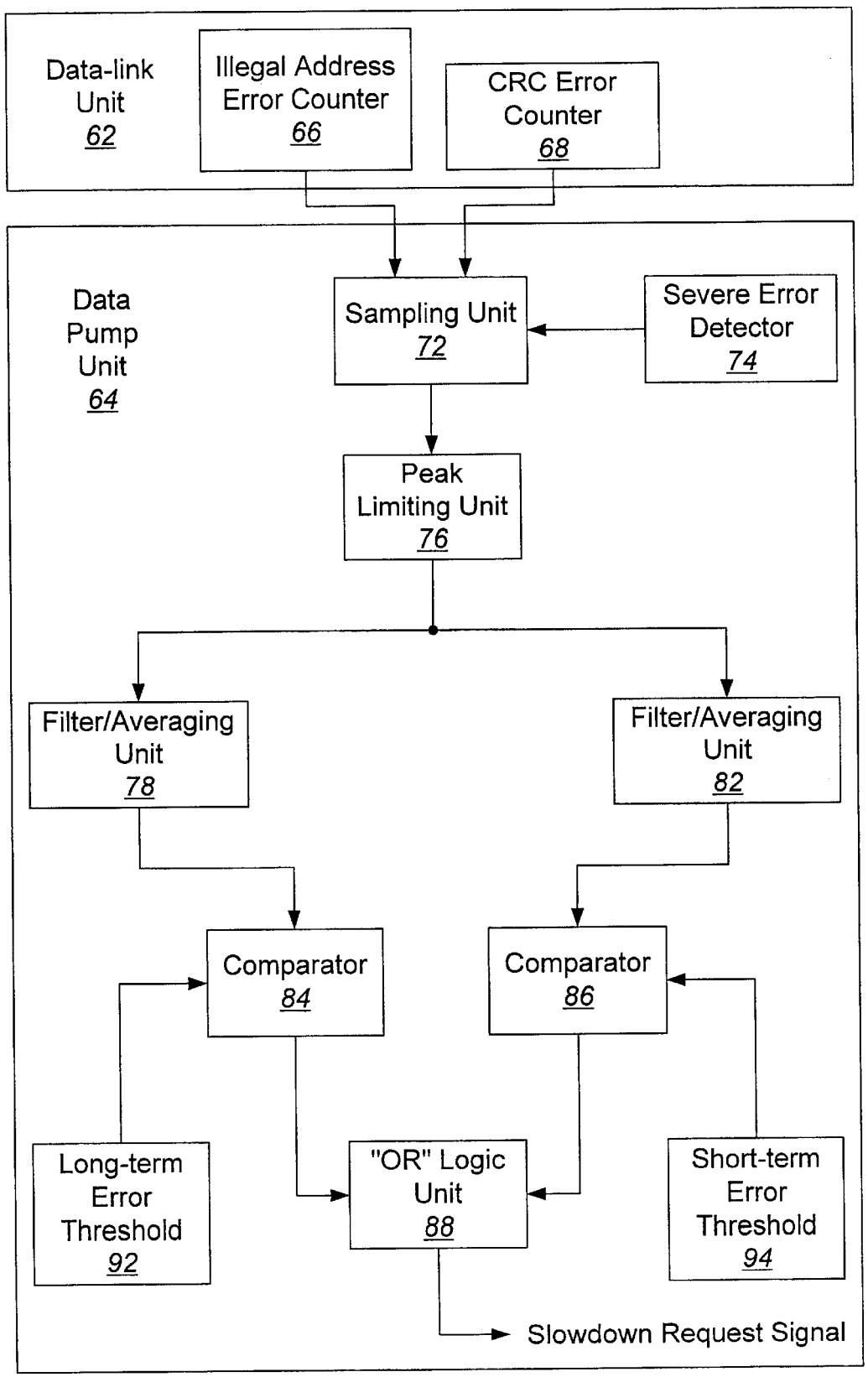
FIG. 3 is a block diagram of an exemplary data rate control system that illustrates data rate control systems, methods, and computer program products in accordance with the present invention.

With reference now to FIG. 3, a preferred architecture of a data rate control system for a communication device, such as a V.90 analog or client modem, will be described hereafter. A data rate control system, in accordance with the present invention, includes a data-link unit 62 and a data pump unit 64. The data-link unit 62 represents an implementation of a data-link protocol, such as the ITU V.42 Recommendation directed to error control procedures on analog transmission facilities. The data pump unit 64 implements both aspects of the present invention and customary modem functionality, such as, for example, but not limited to, filtering, modulation, equalization, echo cancellation, encoding, framing, etc.

The data-link unit 62 is generally used to guarantee the integrity of received data via detection of errors and to coordinate the retransmission of lost or bad data with a corresponding data-link unit associated with a modem at the other end of the connection. In accordance with the present invention, the data-link unit 62 maintains at least one error counter for tracking the number of errors detected at the data-link protocol level. As shown in FIG. 3, two error counters—an illegal address error counter 66 and a cyclic redundancy check (CRC) error counter 68—are maintained in a preferred embodiment of the data rate control system. The data-link unit 62 increments the illegal address counter 66 each time a packet (or other comparable construct in which data are packaged for transmission) is received with an invalid address. Likewise, the data-link unit 62 increments the CRC error counter each time a packet is received that contains a CRC checksum that does not match the computed CRC for the data in the packet. It is envisioned that additional or alternative counters may be defined and maintained for other types of data-link protocol errors, or even errors that are detected at higher levels in the communication protocol (e.g., network layer, transport layer, session layer, etc.) or at a lower level in the communication protocol (i.e., physical layer). Preferably, however, illegal address errors, which are tracked using the illegal address error counter 66, are given precedence over other possible illegal frame or packet conditions that may be detected when noise corrupts an idle pattern. Line errors during transmission of an idle pattern may often appear to the receiver as packets with an illegal address.

The data pump unit 64 includes a sampling unit 72 that periodically reads the illegal address error counter 66 and the CRC error counter 68 to obtain the current error counts from each counter. The sampling unit 72 determines a change or increase in the error counters 66 and 68 from a preceding read operation and then sums these changes together to compute a sampling interval error count. In a preferred embodiment, the sampling unit 72 reads the illegal address error counter 66 and the CRC error counter 68 every half-second.

A severe error detector 74 may be used to detect instability in a modem's receiver. For example, the severe error detector 74 may be configured to detect instances in which a signal sample output from the modem's equalizer falls outside a predefined boundary or boundaries, which contain valid points in the signal constellation used for transmitting symbols to the modem receiver. If the error signal derived from such an outlying equalizer signal sample is used to update the equalizer filter coefficients, then the coefficients may be adjusted away from their desired steady state values, which may result in a period of instability until the coefficients return to their previous values before the severe error event(s) occurred. Accordingly, if the severe error detector 74 detects instability, then the sampling interval error count is set to zero to effectively mask the severe error event(s) as at least a portion of the errors detected at the data-link protocol level are presumed to be connected with the source of the modem's instability. Exemplary embodiments of the severe error detector 74 are disclosed in U.S. Pat. No. 6,341,360 entitled DECISION FEEDBACK EQUALIZERS, METHODS, AND COMPUTER PROGRAM PRODUCTS FOR DETECTING SEVERE ERROR EVENTS AND PRESERVING EQUALIZER FILTER CHARACTERISTICS IN RESPONSE THERETO, issued Jan. 2, 2002 and U.S. Pat. No. 6,553,518 entitled SEVERE ERROR DETECTORS, METHODS, AND COMPUTER PROGRAM PRODUCTS THAT USE CONSTELLATION SPECIFIC ERROR EVENT THRESHOLDS TO DETECT SEVERE ERROR EVENTS DURING DEMODULATION OF A SIGNAL COMPRISING SYMBOLS FROM A PLURALITY OF SYMBOL CONSTELLATIONS, issued Apr. 22, 2003, the disclosures of which are hereby incorporated herein by reference.

The data pump unit 64 optionally includes a peak limiting unit 76 that prevents the sampling interval error count from exceeding a maximum error threshold. In a preferred embodiment of the data rate control system used in a V.90 analog/client modem, the maximum error threshold is set to four. In practice, the maximum error threshold may be set based on, for example, the data rate and/or the sampling interval duration or could even be set dynamically.

The sampling interval error count after being limited by the peak limiting unit 76 is then provided as input to a pair of filter/averaging units 78 and 82 arranged in parallel. The filter/averaging units 78 and 82 maintain a running average of the sampling interval error count and are preferably configured such that the filter/averaging unit 78 is characterized by a slow time-constant and the filter/averaging unit 82 is characterized by a fast time-constant. Accordingly, the filter/averaging unit 78 generates a slow-filtered sampling interval error count and the filter/averaging unit 82 generates a fast-filtered sampling interval error count at respective output terminals thereof.

The data pump unit 64 further includes a control logic unit, which comprises a pair of comparators 84 and 86 arranged in parallel and coupled to the filter/averaging units 78 and 82, respectively, and an "OR" logic unit 88. The outputs of the comparators 84 and 86 are provided as inputs to the "OR" logic unit 88, which generates a data rate slowdown request signal in accordance with the present invention. More specifically, the comparator 84 receives both the slow-filtered sampling interval error count from the filter/averaging unit 78 and a long-term error threshold 92 as inputs and generates a long-term error comparison signal at its output that indicates whether the slow-filtered sampling interval error count exceeds the long-term error threshold 92. Similarly, the comparator 86 receives both the fast-filtered sampling interval error count from the filter/ averaging unit 82 and a short-term error threshold 94 as inputs and generates a short-term error comparison signal at its output that indicates whether the fast-filtered sampling interval error count exceeds the short-term error threshold 94. If either the long-term error comparison signal or the short-term error comparison signal indicate that their corresponding error threshold (i.e., long-term error threshold 92 and short-term error threshold 94, respectively) has been exceeded, then the "OR" logic unit 88 generates the data rate slowdown request signal, which may be used to initiate a data rate renegotiation.

Data Rate Control System Software Architecture

Figure 4:
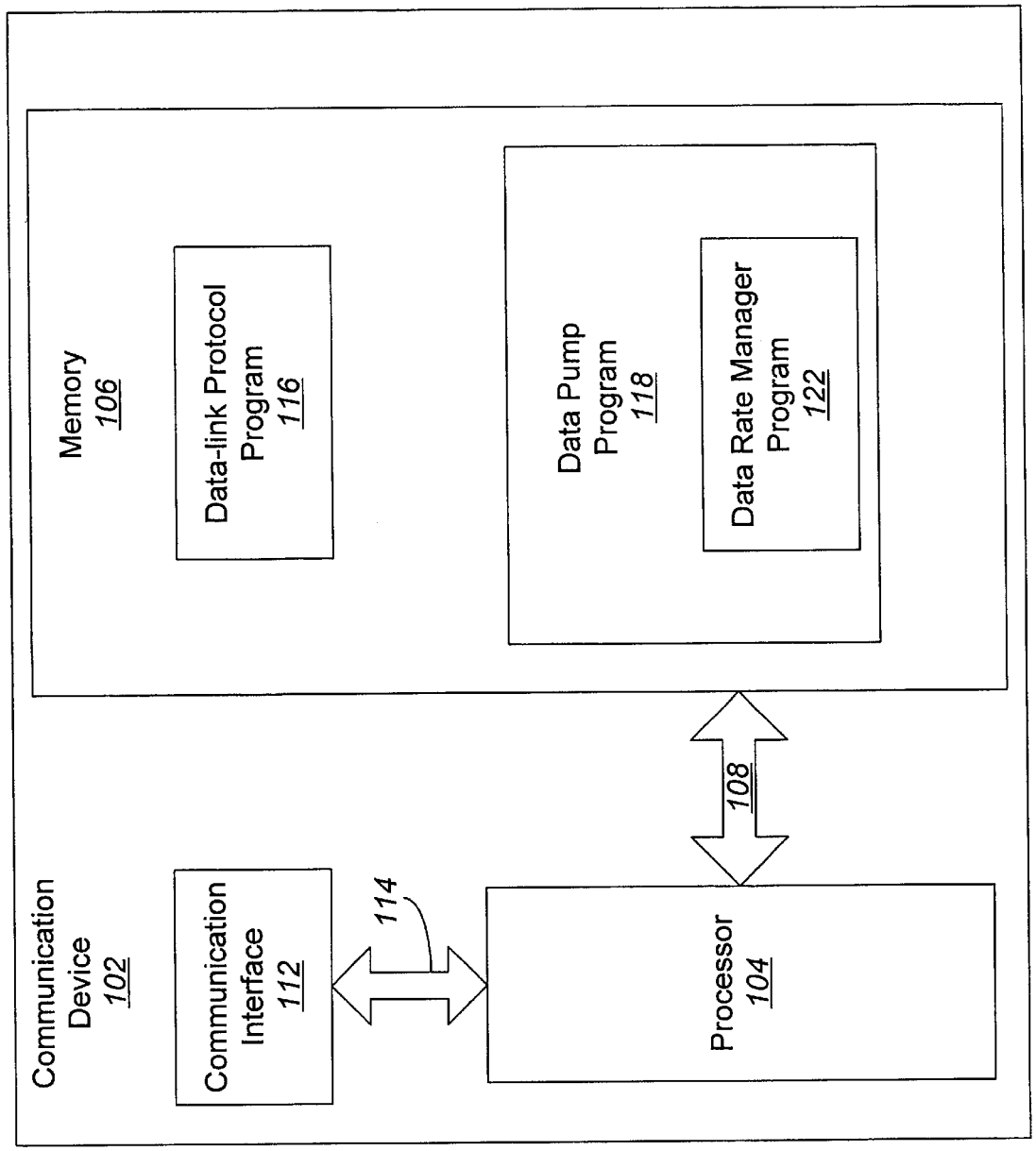
FIG. 4 is a block diagram that illustrates a software architecture for a communication device, such as a V.90 modem, and that includes a data rate control system shown in FIG. 3.

Referring now to FIG. 4, a software architecture for the data-link unit 62 and data pump unit 64 of a communication device 102, such as a V.90 modem, will be described. The communication device 102 includes a processor 104, preferably a digital signal processor, which communicates with a memory 106 via an address/data bus 108. In addition, the processor 104 may receive and transmit information to external devices via a communication interface 112, which is accessed through an input/output (I/O) bus 114. The processor 104 may be any commercially available or custom processor suitable for a real-time intensive embedded application. The memory 106 is representative of the overall hierarchy of memory devices containing the software and data used to implement the functionality of the communication device 102. The memory 106 may include, but is not limited to, the following types of devices: cache, ROM, PROM, EPROM, EEPROM, flash, SRAM, and DRAM. As shown in FIG. 4, the memory 106 includes program modules for implementing the functionality of the components discussed in the foregoing with reference to FIG. 3. That is, the memory 106 includes a data-link protocol program module 116 and a data pump program module 118. Each of these program modules corresponds to a respective component of the data rate control system shown in FIG. 3. In addition, the data pump program module 116 further comprises a data rate manager program module 122, which negotiates the transmission data rate to be used during a connection with another communication device (e.g., a remote modem) and may use the slowdown request signal from the "OR" logic unit 88 of FIG. 3 to determine when to negotiate a data rate reduction.

The present invention is described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Operations and features provided by the data-link unit 62, data-link protocol program module 116, data pump unit 64, and data pump program module 118 of FIGS. 3 and 4 will be described hereafter with reference to the flow chart of FIGS. 5A and 5B and the architectural diagram of FIG. 3.

Communication Device Data Rate Control

Figure 5A:
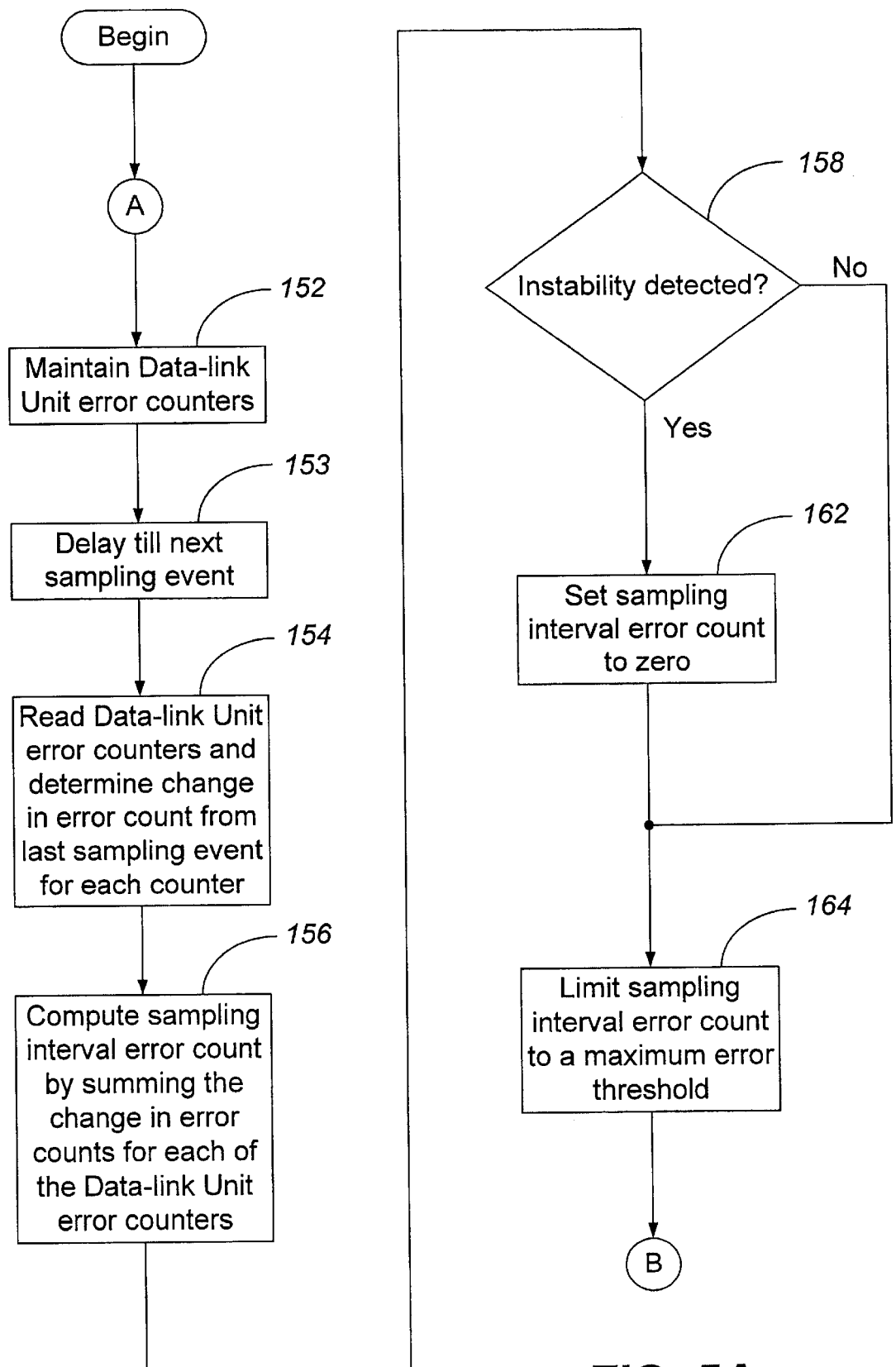
FIGS. 5A–5B are a flow chart that illustrates operations of data rate control systems, methods, and computer program products of FIGS. 3–4 in accordance with the present invention.

Referring now to FIGS. 3 and 5A, the illegal address error counter 66 and the CRC error counter 68 maintain counts at block 152 of illegal address errors and CRC errors, respectively, detected at the data-link protocol level. The sampling unit 72 waits at block 153 for the next sampling event, which preferably occurs every one-half second. At block 154, the sampling unit 72 reads each of the data-link unit error counters, which comprise the illegal address counter 66 and the CRC error counter 68 in a preferred embodiment of the data rate control system, to obtain the current error counts from each counter. Next, the sampling unit 72 determines a change or increase in the error counters 66 and 68 from a preceding read operation, and then sums these changes together to compute a sampling interval error count at block 156.

If the severe error detector 74 detects instability in the communication device (e.g., in a modem's equalizer) at block 158, then the sampling interval error count is set to zero at block 162 as at least a portion of the errors detected at the data-link protocol level are presumed to be connected with the source of the modem's instability. Otherwise, if instability in the communication device is not detected at block 158, then the sampling interval error count is unaffected by the severe error detector 74.

In addition to adjusting the sampling interval error count in view of instability in the communication device, the sampling interval error count may optionally be limited to a maximum value by the peak limiting unit 76 at block 164. More specifically, the peak limiting unit 76 clips the sampling interval error count at a maximum error threshold (i.e., sets the sampling interval error count to the maximum error threshold if the sampling interval error count exceeds the maximum error threshold), which is set to four in a preferred embodiment of the data rate control system used in a V.90 analog/client modem. A motivating factor for limiting the sampling interval error count to a maximum value is to prevent a single noise burst from causing a data rate slowdown. This may be particularly useful when illegal address errors are included in the error count as many of these errors may occur during the time it takes to transmit a single packet in a V.90 communication session.

Figure 5B:
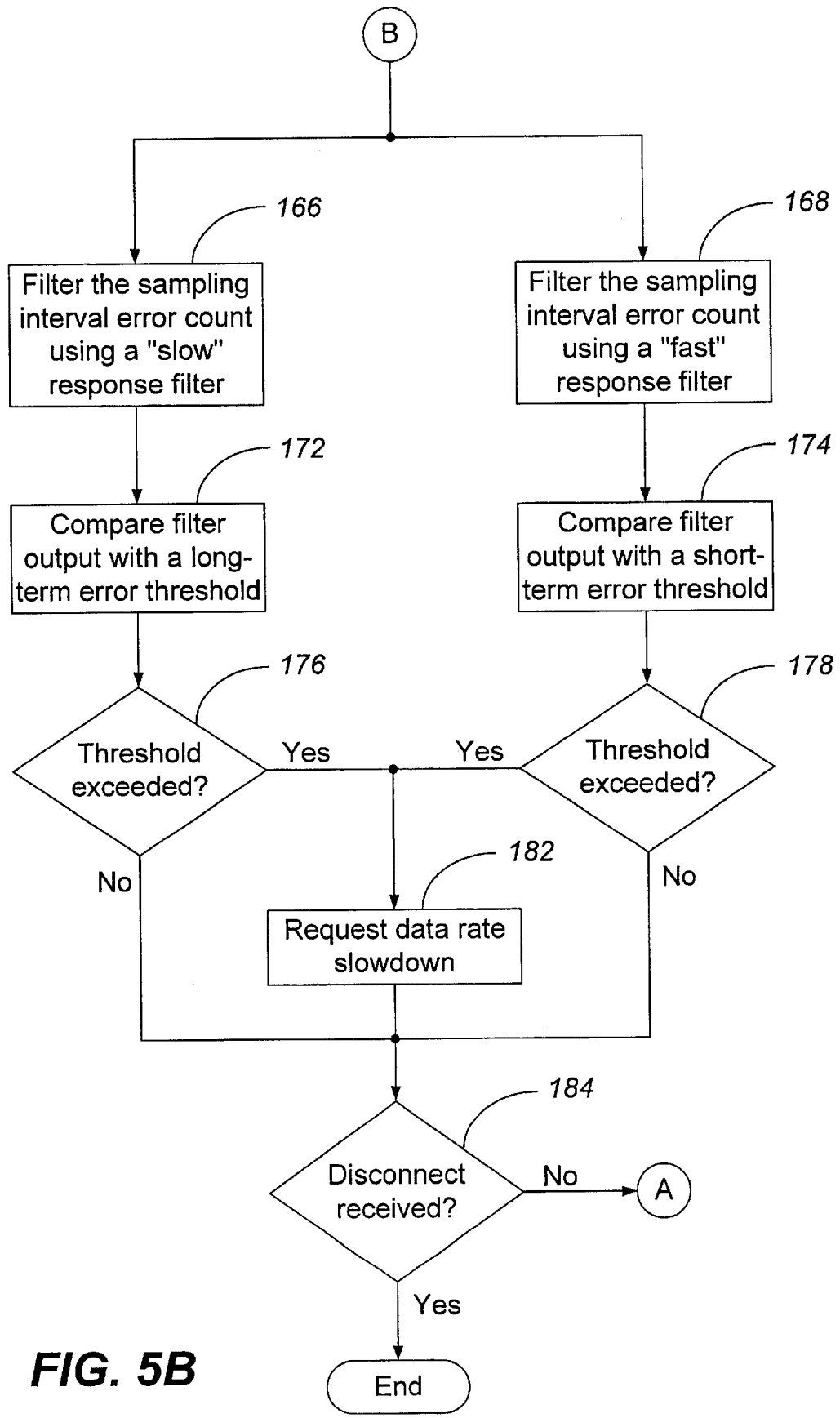

Operations continue by following connector B to FIG. 5B where the sampling interval error count, after any adjustment due to instability in the communication device by the severe error detector 74 or clipping by the peak limiting unit 76 has been applied, is provided in parallel to the filter/averaging units 78 and 82 at blocks 166 and 168, respectively. In a preferred embodiment of the data rate control system, the filter/averaging unit 78 filters the sampling interval error count at block 166 by multiplying a previous output by a first weight factor (WF1) to compute a first component and multiplying the sampling interval error count at the input of the filter/averaging unit 78 by a second weight factor (WF2) to compute a second component. The first and second components are added together to generate a slow-filtered sampling interval error count at the output of the filter/averaging unit 78. The weight factors are preferably fractional values whose sum equals one. Moreover, the first and second weight factors (WF1 and WF2) are preferably set so that the filter/averaging unit 78 is characterized by a slow time-constant (i.e., the output of the filter/averaging unit 78 responds relatively slowly to changes at the input of the filter/averaging unit 78). In a preferred embodiment of the data rate control system, WF1 is set to 15/16 and WF2 is set to 1/16.

Similarly, the filter/averaging unit 82 filters the sampling interval error count at block 168 by multiplying a previous output by a first weight factor (WF1) to compute a first component and multiplying the sampling interval error count at the input of the filter/averaging unit 82 by a second weight factor (WF2) to compute a second component. The first and second components are added together to generate a fast-filtered sampling interval error count at the output of the filter/averaging unit 82. The weight factors are preferably fractional values whose sum equals one. Moreover, the first and second weight factors (WF1 and WF2) are preferably set so that the filter/averaging unit 82 is characterized by a fast time-constant (i.e., the output of the filter/averaging unit 82 responds relatively quickly to changes at the input of the filter/averaging unit 82). In a preferred embodiment of the data rate control system, WF1 is set to 2/5 and WF2 is set to 3/5.

Alternative filter structures may be used without departing from the principles of the present invention. Nevertheless, the filter/averaging units 78 and 82 are preferably implemented using weight factors or filter coefficients that provide one of the filters with a fast time-constant and the other filter with a slow time-constant relative to each other.

The slow-filtered sampling interval error count from the output of the filter/averaging unit 78 is provided as an input to the comparator 84, which compares the slow-filtered sampling interval error count with a long-term error threshold 92 at block 172. In particular, the comparator 84 generates a long-term error comparison signal at its output that indicates whether the slow-filtered sampling interval error count exceeds the long-term error threshold 92. Likewise, the fast-filtered sampling interval error count from the output of the filter/averaging unit 82 is provided as an input to the comparator 86, which compares the fast-filtered sampling interval error count with a short-term error threshold 94 at block 174. The comparator 86 generates a short-term error comparison signal at its output that indicates whether the fast-filtered sampling interval error count exceeds the short-term error threshold 94.

If either the long-term error comparison signal or the short-term error comparison signal indicate that their corresponding error threshold (i.e., long-term error threshold 92 and short-term error threshold 94) has been exceeded as determined at blocks 176 and 178, respectively, then the "OR" logic unit 88 generates the slowdown request signal at its output at block 182 to request a data rate slowdown. The slowdown request signal may be provided to the data rate manager program module 122 (see FIG. 4), which may then negotiate a data rate reduction with a remote communication device.

If, however, neither of the error thresholds 92 and 94 have been exceeded as determined at blocks 176 and 178, respectively, then no data rate slowdown is requested. Finally, as represented by block 184, operations of the data rate control system continue until the connection is terminated.

In a preferred embodiment of the data rate control system used in a V.90 analog/client modem, the long-term error threshold 92 is selected such that a sustained error rate in excess of one-half error per second will trigger the "OR" logic unit 88 to generate the data rate slowdown request signal. In addition, the short-term error threshold 94 is preferably selected such that a short-term error rate in excess of two errors per second will trigger the "OR" logic unit 88 to generate the data rate slowdown request signal. Lastly, the sampling unit 72 preferably reads the illegal address error counter 66 and CRC error counter 68 every one-half second. It should be understood, however, that the particular values used for the long-term and short-term error thresholds 92 and 94, the error sampling frequency, and the maximum error threshold used by the peak limiting unit 76 may be unique to a particular application. Accordingly, these values may be adjusted to suit both the environment in which the data rate control system is used and user preferences with regard to the sensitivity of the data rate control system to errors.

Thus, unlike traditional data rate or error control systems that use a single error threshold, which may prohibit the system from discriminating between isolated bursts of many errors spanning a short time duration and fewer errors that continue to occur over an extended time frame, data rate control systems, in accordance with the present invention, use two independent filters to process errors—one filter with a fast time-constant that may respond to large error bursts spanning a short time period and a second filter with a slow time-constant that may respond to lower numbers of errors, which are sustained over an extended time period.

The flow charts of FIGS. 5A and 5B illustrate the architecture, functionality, and operations of a possible implementation of the communication device 102 software. In this regard, each block represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

We claim:

1. A data rate control system for a communication device, comprising:
    a data-link unit that maintains an error counter, which contains an error count;
    a sampling unit that periodically reads the error counter and determines a sampling interval error count corresponding to a change in the error count since a previous read of the error counter;
    a first filter unit characterized by a slow time-constant that is responsive to the sampling interval error count and generates a slow-filtered sampling interval error count;
    a second filter unit characterized by a fast time-constant that is responsive to the sampling interval error count and generates a fast-filtered sampling interval error count; and
    a control logic unit that is responsive to the slow-filtered sampling interval error count and the fast-filtered sampling interval error count and that generates a data rate slowdown request signal if the slow-filtered sampling interval error count exceeds a first threshold and that generates the data rate slowdown request signal if the fast-filtered sampling interval error count exceeds a second threshold.

2. A data rate control system as recited in claim 1, further comprising:
    a peak limiting unit that limits the sampling interval error count to a maximum error threshold, the first and second filter units being responsive to the sampling interval error count as limited by the peak limiting unit.

3. A data rate control system as recited in claim 1, further comprising:
    a severe error detector coupled to the sampling unit.

4. A data rate control system as recited in claim 1, wherein the first threshold comprises a long-term error threshold and the second threshold comprises a short-term error threshold and wherein the control logic unit comprises:
    a first comparator that is responsive to the slow-filtered sampling interval error count and the long-term error threshold and that generates a long-term error comparison signal;
    a second comparator that is responsive to the fast-filtered sampling interval error count and the short-term error threshold and that generates a short-term error comparison signal; and
    an OR logic unit that is responsive to the long-term and short-term error comparison signals and generates the data rate slowdown request signal if the slow-filtered sampling interval error count exceeds the long-term error threshold and generates the data rate slowdown request signal if the fast-filtered sampling interval error count exceeds the short-term error threshold.

5. A data rate control system as recited in claim 1, wherein the data-link unit maintains a plurality of error counters, each of the plurality of error counters containing an error count.

6. A data rate control system as recited in claim 5, wherein the sampling unit periodically reads the plurality of error counters and determines the sampling interval error count by summing changes in the plurality of error counts since previous reads of the plurality of error counters.

7. A data rate control system as recited in claim 5, wherein one of the plurality of error counters is an illegal address error counter.

8. A data rate control system as recited in claim 5, wherein one of the plurality of error counters is a cyclic redundancy check (CRC) error counter.

9. A method of controlling a data rate in a communication device, comprising the steps of:
    filtering a sampling interval error count to generate a slow-filtered sampling interval error count;
    filtering said sampling interval error count to generate a fast-filtered sampling interval error count;
    generating a data rate slowdown request signal if the slow-filtered sampling interval error count exceeds a first threshold; and
    generating the data rate slowdown request signal if the fast-filtered sampling interval error count exceeds a second threshold.

10. A method as recited in claim 9, further comprising the step of:
    limiting the sampling interval error count to a maximum error threshold.

11. A method as recited in claim 9, further comprising the step of:
    setting the sampling interval error count to zero if instability is detected in the communication device.

12. A method as recited in claim 9, wherein the step of filtering the sampling interval error count to generate the slow-filtered sampling interval error count comprises the steps of:
    computing a first component by multiplying a previous slow-filtered sampling interval error count by a first weight factor (WF1);
    computing a second component by multiplying the sampling interval error count by a second weight factor (WF2); and
    adding the first component to the second component to generate the slow-filtered sampling interval error count.

13. A method as recited in claim 12, wherein:
the WF1 is between zero and one;
the WF2 is between zero and one; and
the WF1 plus the WF2 is about one.

14. A method as recited in claim 12, wherein:
the WF1 is about 15/16; and
the WF2 is about 1/16.

15. A method as recited in claim 9, wherein the step of filtering the sampling interval error count to generate the fast-filtered sampling interval error count comprises the steps of:
computing a first component by multiplying a previous fast-filtered sampling interval error count by a first weight factor (WF1);
computing a second component by multiplying the sampling interval error count by a second weight factor (WF2); and
adding the first component to the second component to generate the fast-filtered sampling interval error count.

16. A method as recited in claim 15, wherein:
the WF1 is between zero and one;
the WF2 is between zero and one; and
the WF1 plus the WF2 is about one.

17. A method as recited in claim 15, wherein:
the WF1 is about 2/5; and
the WF2 is about 3/5.

18. A method as recited in claim 9, wherein the first threshold comprises a long-term error threshold and wherein the step of generating the data rate slowdown request signal if the slow-filtered sampling interval error count exceeds the first threshold comprises the steps of:
comparing the slow-filtered sampling interval error count with the long-term error threshold; and
generating the data rate slowdown request signal if the slow-filtered sampling interval error count exceeds the long-term error threshold.

19. A method as recited in claim 9, wherein the second threshold comprises a short-term error threshold and wherein the step of generating the data rate slowdown request signal if the fast-filtered sampling interval error count exceeds the second threshold comprises the steps of:
comparing the fast-filtered sampling interval error count with the short-term error threshold; and
generating the data rate slowdown request signal if the fast-filtered sampling interval error count exceeds the short-term error threshold.

20. A method as recited in claim 9, further comprising the steps of:
maintaining an error counter that contains an error count;
periodically reading the error counter; and
determining a change in the error count since a previous read of the error counter so as to provide the sampling interval error count.

21. A method as recited in claim 20, wherein the maintaining step comprises the step of:
maintaining a plurality of error counters, each of the plurality of error counters containing an error count; and wherein the reading step comprises the step of:
reading the plurality of error counters; and wherein the determining step comprises the step of:
determining the sampling interval error count by summing changes in the plurality of error counts since previous reads of the plurality of error counters.

22. A computer program product for controlling a data rate in a communication device, comprising:
a computer readable storage medium having computer readable program code embodied therein, the computer readable program code comprising:
computer readable program code for filtering a sampling interval error count to generate a slow-filtered sampling interval error count;
computer readable program code for filtering said sampling interval error count to generate a fast-filtered sampling interval error count;
computer readable program code for generating a data rate slowdown request signal if the slow-filtered sampling interval error count exceeds a first threshold; and
computer readable program code for generating the data rate slowdown request signal if the fast-filtered sampling interval error count exceeds a second threshold.

23. A computer program product as recited in claim 22, further comprising:
computer readable program code for limiting the sampling interval error count to a maximum error threshold.

24. A computer program product as recited in claim 22, further comprising:
computer readable program code for setting the sampling interval error count to zero if instability is detected in the communication device.

25. A computer program product as recited in claim 22, wherein the computer readable program code for filtering the sampling interval error count to generate the slow-filtered sampling interval error count comprises:
computer readable program code for computing a first component by multiplying a previous slow-filtered sampling interval error count by a first weight factor (WF1);
computer readable program code for computing a second component by multiplying the sampling interval error count by a second weight factor (WF2); and
computer readable program code for adding the first component to the second component to generate the slow-filtered sampling interval error count.

26. A computer program product as recited in claim 25, wherein:
the WF1 is between zero and one;
the WF2 is between zero and one; and
the WF1 plus the WF2 is about one.

27. A computer program product as recited in claim 25, wherein:
the WF1 is about 15/16; and
the WF2 is about 1/16.

28. A computer program product as recited in claim 22, wherein the computer readable program code for filtering the sampling interval error count to generate the fast-filtered sampling interval error count comprises:
computer readable program code for computing a first component by multiplying a previous fast-filtered sampling interval error count by a first weight factor (WF1);
computer readable program code for computing a second component by multiplying the sampling interval error count by a second weight factor (WF2); and
computer readable program code for adding the first component to the second component to generate the fast-filtered sampling interval error count.

29. A computer program product as recited in claim 27, wherein:
the WF1 is between zero and one;
the WF2 is between zero and one; and
the WF1 plus the WF2 is about one.

30. A computer program product as recited in claim 27, wherein:
the WF1 is about 2/5; and
the WF2 is about 3/5.

31. A computer program product as recited in claim 22, wherein the first threshold comprises a long-term error threshold and wherein the computer readable program code for generating the data rate slowdown request signal if the slow-filtered sampling interval error count exceeds the first threshold comprises:
computer readable program code for comparing the slow-filtered sampling interval error count with the long-term error threshold; and
computer readable program code for generating the data rate slowdown request signal if the slow-filtered sampling interval error count exceeds the long-term error threshold.

32. A computer program product as recited in claim 22, wherein the second threshold comprises a short-term error threshold and wherein the computer readable program code for generating the data rate slowdown request signal if the fast-filtered sampling interval error count exceeds the second threshold comprises:
computer readable program code for comparing the fast-filtered sampling interval error count with the short-term error threshold; and
computer readable program code for generating the data rate slowdown request signal if the fast-filtered sampling interval error count exceeds the short-term error threshold.

33. A computer program product as recited in claim 22, further comprising:
computer readable program code for maintaining an error counter that contains an error count;
computer readable program code for periodically reading the error counter; and
computer readable program code for determining a change in the error count since a previous read of the error counter so as to provide the sampling interval error count.

34. A computer program product as recited in claim 33, wherein the computer readable program code for maintaining comprises:
computer readable program code for maintaining a plurality of error counters, each of the plurality of error counters containing an error count; and wherein the computer readable program code for reading comprises:
computer readable program code for reading the plurality of error counters; and wherein the computer readable program code for determining comprises:
computer readable program code for determining the sampling interval error count by summing changes in the plurality of error counts since previous reads of the plurality of error counters.

35. A data rate control system for a communication device, comprising:
means for filtering a sampling interval error count to generate a slow-filtered sampling interval error count;
means for filtering said sampling interval error count to generate a fast-filtered sampling interval error count; and
means for generating a data rate slowdown request signal if the slow-filtered sampling interval error count exceeds a first threshold; and
means for generating the data rate slowdown request signal if the fast-filtered sampling interval error count exceeds a second threshold.

36. A system as recited in claim 35, further comprising:
means for limiting the sampling interval error count to a maximum error threshold.

37. A system as recited in claim 35, further comprising:
means for setting the sampling interval error count to zero if instability is detected in the communication device.

38. A system as recited in claim 35, wherein the means for filtering the sampling interval error count to generate the slow-filtered sampling interval error count comprises:
means for computing a first component by multiplying a previous slow-filtered sampling interval error count by a first weight factor (WF1);
means for computing a second component by multiplying the sampling interval error count by a second weight factor (WF2); and
means for adding the first component to the second component to generate the slow-filtered sampling interval error count.

39. A system as recited in claim 38, wherein:
the WF1 is between zero and one;
the WF2 is between zero and one; and
the WF1 plus the WF2 is about one.

40. A system as recited in claim 38, wherein:
the WF1 is about 15/16; and
the WF2 is about 1/16.

41. A system as recited in claim 35, wherein the means for filtering the sampling interval error count to generate the fast-filtered sampling interval error count comprises:
means for computing a first component by multiplying a previous fast-filtered sampling interval error count by a first weight factor (WF1);
means for computing a second component by multiplying the sampling interval error count by a second weight factor (WF2); and
means for adding the first component to the second component to generate the fast-filtered sampling interval error count.

42. A system as recited in claim 40, wherein:
the WF1 is between zero and one;
the WF2 is between zero and one; and
the WF1 plus the WF2 is about one.

43. A system as recited in claim 40, wherein:
the WF1 is about 2/5; and
the WF2 is about 3/5.

44. A system as recited in claim 35, wherein the first threshold comprises a long-term error threshold and wherein the means for generating the data rate slowdown request signal if the slow-filtered sampling interval error count exceeds the first threshold comprises:
means for comparing the slow-filtered sampling interval error count with the long-term error threshold; and means for generating the data rate slowdown request signal if the slow-filtered sampling interval error count exceeds the long-term error threshold.

45. A system as recited in claim 35, wherein the second threshold comprises a short-term error threshold and wherein the means for generating the data rate slowdown request signal if the fast-filtered sampling interval error count exceeds the second threshold comprises:

means for comparing the fast-filtered sampling interval error count with the short-term error threshold; and means for generating the data rate slowdown request signal if the fast-filtered sampling interval error count exceeds the short-term error threshold.

46. A system as recited in claim 35, further comprising:

means for maintaining an error counter that contains an error count;

means for periodically reading the error counter; and means for determining a change in the error count since a previous read of the error counter so as to provide the sampling interval error count.

47. A system as recited in claim 46, wherein the means for maintaining comprises:

means for maintaining a plurality of error counters, each of the plurality of error counters containing an error count; and wherein the means for reading comprises:

means for reading the plurality of error counters; and wherein the means for determining comprises:

means for determining the sampling interval error count by summing changes in the plurality of error counts since previous reads of the plurality of error counters.

* * * * *